US010924556B2

(12) United States Patent
Dierckens et al.

(10) Patent No.: US 10,924,556 B2
(45) Date of Patent: Feb. 16, 2021

(54) REAL TIME DYNAMIC TIMEOUT PREDICTION

(71) Applicant: SAP SE, Walldorf (DE)

(72) Inventors: Karl Dierckens, Vancouver (CA); Johnny Ho, Vancouver (CA); Walter Mak, North Vancouver (CA)

(73) Assignee: SAP SE, Walldorf (DE)

(*) Notice: Subject to any disclaimer, the term of this patent is extended or adjusted under 35 U.S.C. 154(b) by 200 days.

(21) Appl. No.: 16/049,014

(22) Filed: Jul. 30, 2018

(65) Prior Publication Data
US 2020/0036798 A1 Jan. 30, 2020

(51) Int. Cl.
G06F 15/16 (2006.01)
H04L 29/08 (2006.01)
G06N 5/02 (2006.01)
H04L 29/06 (2006.01)

(52) U.S. Cl.
CPC .......... H04L 67/143 (2013.01); G06N 5/02 (2013.01); H04L 67/42 (2013.01)

(58) Field of Classification Search
CPC .......... G06N 5/02; H04L 67/143; H04L 67/42
See application file for complete search history.

(56) References Cited

U.S. PATENT DOCUMENTS

| | | | | |
|---|---|---|---|---|
| 6,029,196 A * | 2/2000 | Lenz | ................ | G06F 8/61 709/203 |
| 8,180,922 B2 * | 5/2012 | Dini | ................ | G06F 11/008 709/241 |
| 8,260,736 B1 * | 9/2012 | Lear | ................ | G06N 5/02 706/46 |
| 8,798,647 B1 * | 8/2014 | Haney | ................ | G01S 19/01 455/456.3 |
| 8,966,487 B1 * | 2/2015 | Leonard | ................ | G06F 9/54 718/101 |
| 9,195,805 B1 * | 11/2015 | Brandwine | ................ | G06F 21/00 |
| 9,430,280 B1 * | 8/2016 | Shih | ................ | G06F 9/5005 |
| 9,720,732 B1 * | 8/2017 | Shih | ................ | G06F 9/50 |
| 10,362,434 B2 * | 7/2019 | Hsu | ................ | H04W 76/18 |
| 2003/0061367 A1 * | 3/2003 | Shah | ................ | H04L 47/26 709/230 |
| 2011/0119328 A1 * | 5/2011 | Simitci | ................ | G06F 3/067 709/203 |
| 2012/0106344 A1 * | 5/2012 | Chrysos | ................ | H04L 69/28 370/236 |
| 2012/0209904 A1 * | 8/2012 | Huang | ................ | H04L 67/02 709/203 |
| 2013/0339407 A1 * | 12/2013 | Sharpe | ................ | G06F 16/1752 707/827 |
| 2014/0136659 A1 * | 5/2014 | Fonti | ................ | H04L 43/10 709/219 |
| 2016/0149836 A1 * | 5/2016 | Narayanan | ................ | H04L 65/1033 709/206 |

* cited by examiner

Primary Examiner — Moustafa M Meky
Assistant Examiner — Thorne E Waugh
(74) Attorney, Agent, or Firm — Foutainhead Law Group P.C.

(57) ABSTRACT

Embodiments of the present disclosure pertain to real time dynamic timeout prediction. In one embodiment, a method includes context data for numerous transactions are stored and used to generate predictive weights and an offset. Context for new transactions are used to predict load times, and the offset is used to produce a timeout.

20 Claims, 6 Drawing Sheets

REAL TIME DYNAMIC TIMEOUT PREDICTION

BACKGROUND

The present disclosure relates to data loading, and in particular, to real time dynamic timeout prediction of data load operations over network.

In many computer applications, one computer may send a data request for information to another computer. Accordingly, the computer sending the data request must wait a certain time for the information to be returned. Typically, the requesting system waits a maximum amount of time, known as a timeout, for the data request to be completed. If the data request is not completed within the maximum amount of time, the requesting systems may issue an error signal and/or attempt the data request again. Such timeouts are typically static, set by the system designers when the program code is developed, for example.

Static predefined timeouts can be problematic for several reasons. First, if the timeout is set too high, a user may be required to wait an unnecessarily long time before receiving an error indicating that the request failed. Similarly, if the timeout is set too low, the system may generate too many errors under a false belief that the request has failed when it might not have.

SUMMARY

Embodiments of the present disclosure pertain to real time dynamic timeout prediction. In one embodiment, a method includes storing context data for numerous transactions and using the stored data to generate predictive weights and an offset. Context for new transactions are combined with the weights to predict load times, and the offset is used to produce a timeout.

In one embodiment, the present disclosure includes a computer implemented method comprising storing data on a client system, the data corresponding to a plurality of data requests from the client system to a server system over a network, the data comprising a load time and a plurality of parameters describing context for each data request, receiving an instruction to perform a first data request, determining weights corresponding to the plurality of parameters, the weights indicating a contribution of each parameter to the load time, determining a load time offset value based on the stored data, estimating a first load time for the first data request based on the weights corresponding to the plurality of parameters and a plurality of parameters describing context for the first data request, and in accordance therewith, producing an estimated load time, adding the load time offset value to the estimated load time to produce a first timeout value, and performing the first data request, wherein a timeout for the first data request is set to the first timeout value.

In one embodiment, the stored plurality of parameters and the plurality of parameters describing context for the first data request are numeric values.

In one embodiment, said determining weights, said determining the load time offset value, and said estimating the load time are performed in response to receiving the instruction to open a project.

In one embodiment, the method further comprises, before setting the timeout to the first timeout value, comparing the first timeout value to a range, wherein if the first timeout value is above a maximum timeout value, setting the timeout for the first data request to the maximum timeout value rather than the first timeout value, and wherein if the first timeout value is below a minimum timeout value, setting the timeout for the first data request to the minimum timeout value rather than the first timeout value.

In one embodiment, the stored data forms a matrix having a plurality of rows, each row including a value for load time, a positive value for the specified one of the plurality of data request types and a zero value for each the other data request types, and one of a plurality of values corresponding to the network type.

In one embodiment, determining weights for the parameters comprises performing a linear regression on the stored data.

In one embodiment, determining the load time offset value based on the stored data comprises determining a mean squared error of the stored data.

In one embodiment, the method further comprises adding a constant offset value less than the load time offset value to the estimated load time to produce the first timeout value.

In one embodiment, the plurality of parameters comprise a plurality of first parameters specifying one of a plurality of data request types and second parameter specifying a network type. In one embodiment, the plurality of parameters further comprise a third parameter specifying whether or not a particular data request is an initial data request from the client to the server for a session. In one embodiment, the plurality of parameters further comprise a fourth parameter specifying a latency corresponding to a difference between a first time when the client system sends a data request to the server system and a second time when the client system receives a response from the server system.

In one embodiment, the plurality of first parameters specifying one of the plurality of data request types comprise a plurality of parameters specifying widget types. In one embodiment, the widgets types correspond to different types of charts to be displayed.

In one embodiment, the client system is one of an application on a mobile device or a browser on a client computer.

In one embodiment, the network type specifies one of a WiFi network or a cellular network.

In one embodiment, estimating a load time based on the weights corresponding to the plurality of parameters and the plurality of parameters describing context for the first data request comprises performing a dot product between an N×1 vector of said weights and an N×1 vector of values for said plurality of parameters describing context for the first data request.

In one embodiment, the data is stored for a maximum number of data requests for each data request type, and wherein data corresponding to a most recent data request is stored, and wherein stored data corresponding to an oldest data request is deleted when the maximum number of stored data requests for a particular data request type is reached.

In one embodiment, when a response time of the first data request exceeds the first timeout value, the method further comprises storing the first timeout value, multiplied by a factor greater than one, with the plurality of parameters describing context for the first data request with said stored data and repeating said step of determining weights and said step determining the load time offset value (Increase Fast).

Various embodiments of the techniques described herein may be implemented on a non-transitory machine-readable medium storing a program executable by at least one processing unit of a computer, the program comprising sets of instructions for performing the process steps described herein.

Other embodiments may include a mobile computer system comprising a processor and a non-transitory machine-readable medium storing a program executable by the processor, the program comprising sets of instructions for performing the process steps described herein.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Features and advantages of the present disclosure store load times for data requests together with associated context data to build a historical dataset of load times and improve predictions on timeouts for future requests. Timeouts for a new data request may be determined dynamically by using the stored data to predict a load time for the new data request (e.g., an estimate) and adding an offset buffer to the predicted load time to set the timeout value.

Figure 1:
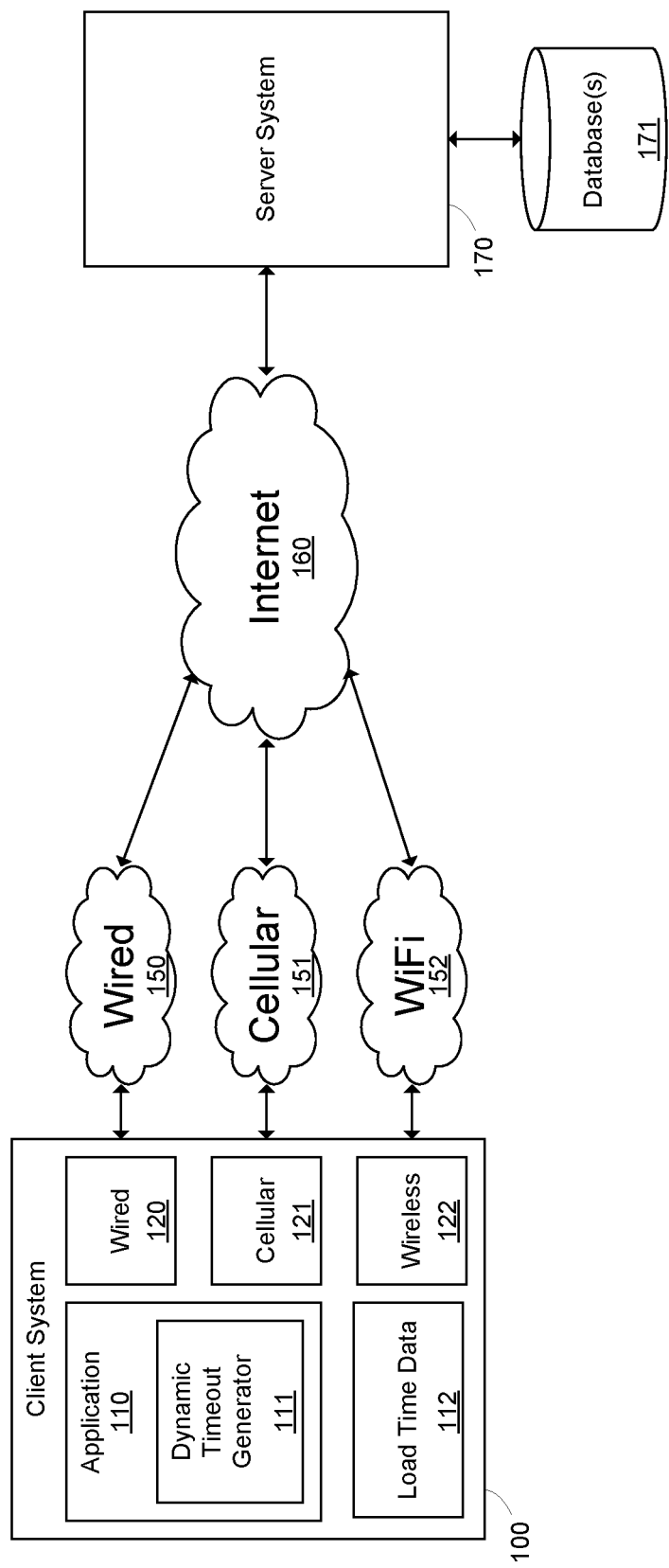
FIG. 1 illustrates a computer system using a dynamic timeout according to one embodiment.

FIG. 1 illustrates a computer system using a dynamic timeout according to one embodiment. Client system 100 may include an application 110 that communicates with server system 170 over a network. Features and advantages of the present disclosure include determining a timeout for transactions between the client and server dynamically in real time, for example. Here, client system 100 may communicate with server system 170 over a number of different network arrangements. For example, client system 100 may include a wired communication component 120 (e.g., an Ethernet transceiver) for communicating with a wired network 150. Additionally, client system 100 may include a cellular communication component 121 (e.g., LTE, 4G, 5G, etc.) for communication with a cellular network 151. In some embodiments, client system 100 may include a wireless communication component 122 (e.g., WiFi) for communication with a wireless network 152. Networks 150-152 may communicate with server system 170 over the Internet 160.

In different circumstances, an application 110 on client system 100 may perform transactions with server system 170 using different networks. For example, client system may be a mobile device in an office setting where WiFi or an Ethernet docking station may be available. Outside the office, the mobile device may perform transactions using a cellular network. As a user travels around, the mobile device may perform transactions over different cellular networks. The different networks may perform transactions at very different speeds. Thus, a transaction conducted over WiFi may be faster than a transaction conducted over cellular, and a transaction conducted over one cellular network, such as LTE 4G, may be faster than a transaction conducted over another cellular network, such as 3G, for example. Features and advantages of the present disclosure save context data of various transactions (e.g., data requests) and use the stored data to dynamically determine a timeout in real time to more closely fit the timeout to the actual conditions experienced by the client system.

In one embodiment, the client system stores data corresponding to a plurality of data requests from the client system 100 to the server system 170 over a network. The data comprises a load time for the data request and a plurality of parameters describing context for the data request. Context for the data request may include a wide range of parameters that impact the load time. For example, the parameters include a parameter specifying a network type (e.g., Wired, WiFi, Cellular, etc. . . . ), parameters specifying different request types, where different request types may have correspondingly different load times, parameters specifying whether or not a particular data request is the first data request from the client to the server for a session, where a first data request may require additional server setup time, for example, and/or a parameter specifying a latency, where latency may correspond to a difference between a first time when the client system sends a data request to the server system and a second time when the client system receives a response from the server system. One example of such data is shown in FIG. 1 as load time data 112.

In one embodiment, data is stored for a maximum number of data requests (e.g., 75). As new data requests are performed, the resulting load time and context data for each request is added to the stored data set. If the maximum number is reached, then data resulting from new data requests are stored and older data discarded to maintain the stored data within the maximum. For example, in one embodiment, data for a maximum number of data requests may be stored for each data request type. For instance, if the data request types correspond to different data requests for different types of charts, then each chart type may have up to a maximum number of stored data elements (context and load times). Thus, a first chart may have 75 data entries of context and load times, a second chart may have another 75 data entries of context and load time, and so on for other data request types. Further, data corresponding to a most recent data request continues to be stored, and stored data corresponding to an oldest data request may be deleted when the maximum number of stored data requests for a particular data request type is reached. As illustrated below, this results in the advantageous result that the timeouts are produced dynamically according to real time conditions, which are constantly updated to capture current context. Further, as described below, changes in transaction context may impact the timeout slowly.

In one embodiment, once the data is stored, determining a timeout may start with the client system receiving an instruction to perform a first data request. For example, a user may access a project that requires data from backend server 170. Application 110, for example, on client system 100 may include a dynamic timeout generator 111. In response to the instruction to perform the first data request, timeout generator component 111 may determine weights corresponding to the plurality of parameters, where the weights indicating a contribution of each parameter to the load time. For example, the weights may correspond to a contribution to total load time of various parameters, such as a network type (e.g, WiFi or Cellular), a data request type, a first data request (versus a subsequent request against the same server for a project), or any other context data used to characterize the response time of a data request. Additionally, the timeout generator component may determine a load time offset value based on the stored data. The load time offset value may be based on variations in the stored data. For example, as described in more detail below, a load time offset value may be based on a mean square error of the stored data. The system may further estimate a load time based on the weights corresponding to the plurality of parameters and a plurality of parameters describing context for the first data request to produce an estimated load time. For example, as mentioned above, if the stored data includes 3 context parameters (e.g., data request type, first data request, network type) for each stored load time, then there will be 3 weights corresponding to the 3 stored parameters (e.g., one for a data request type parameter, one for the first data request parameter, and one for the network type parameter). These weights may be combined with context data for the current data request to obtain an estimated load time for the current data request. For example, if the current data request is a first data request over a WiFi network for a bar chart, then there will similarly be 3 parameters describing context for the first (or current) data request (e.g., one numeric parameter corresponding to a data request for a bar chart, one numeric parameter corresponding to the fact that the request is a first request, and one numeric value corresponding to a WiFi network). Each of the 3 parameters for the current data request may be weighted by the 3 weights to produce an estimated load time for the first data request, for example. A detailed example of this process is described in more detail below.

Once the estimated load time is obtained, a timeout may be set for the first data request by offsetting (or buffering) the estimated load time such that, for example, typical load times within an error margin of the estimated load time will not trigger an error. In one embodiment, a first timeout for the first data request is obtained by adding the load time offset value (calculated above) to the estimated load time. The first data request may then be performed, with the timeout for the first data request is set to the first timeout value, for example.

Figure 2:
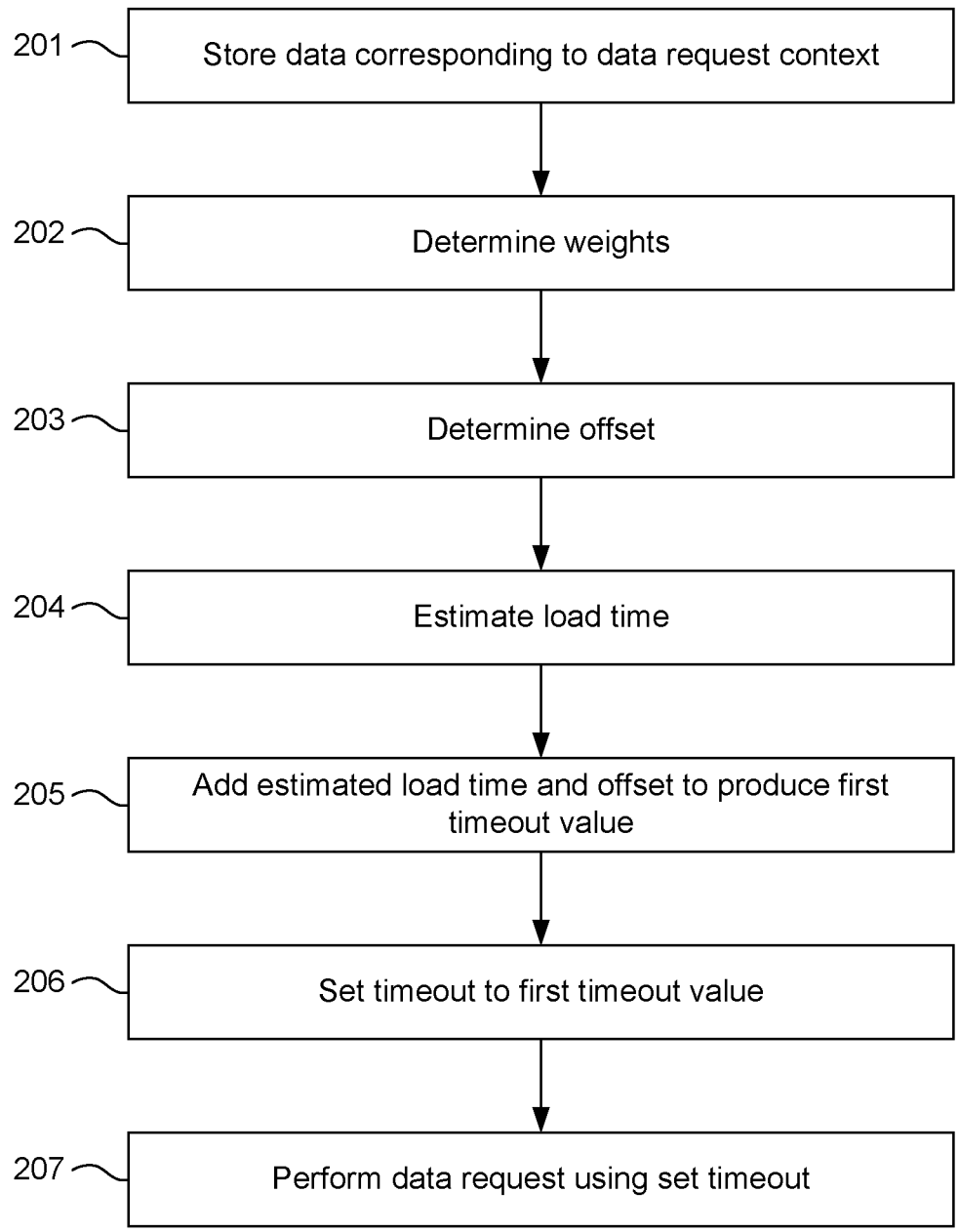
FIG. 2 illustrates a dynamic timeout method according to one embodiment.

FIG. 2 illustrates a dynamic timeout method according to one embodiment. At 201, data corresponding to a plurality of data requests from a client system to a server system over a network is stored on a client system. The data corresponds to a plurality of such data requests. The data includes a load time and context parameters describing aspects of the environment that impact the load time. The parameters may include a plurality of first parameters specifying one of a plurality of data request types and second parameter specifying a network type. At 202, weights corresponding to the plurality of parameters are determined (e.g., in response to receiving an instruction to perform a first data request). The weights indicate a contribution of each parameter to the load time. At 203, a load time offset value is determined based on the stored data. At 204, a first load time is estimated for the first data request based on the weights corresponding to the plurality of parameters and a plurality of parameters describing context for the first data request to produce an estimated load time. As described in more detail below, in one embodiment a vector of weights may be combined with a vector of context parameters for the first request using a dot product to obtain the estimated load time, for example. At 205, the load time offset value is added to the estimated load time to produce a first timeout value. At 206, the timeout for the first request is set to the first timeout value. At 207, the first data request is performed using the set timeout.

Figure 3:
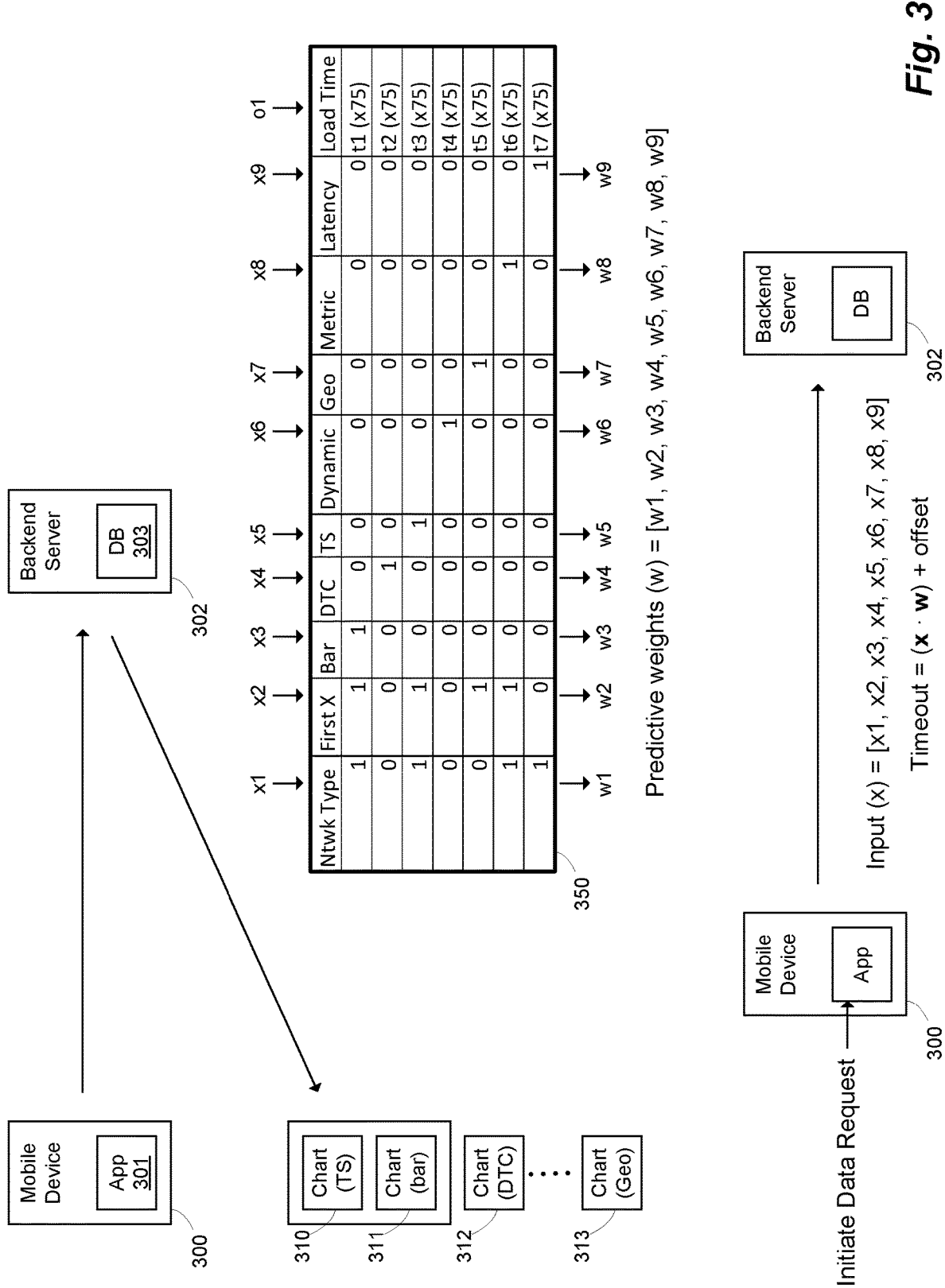
FIG. 3 illustrates an example application using a dynamic timeout according to one embodiment.

FIG. 3 illustrates an example application using a dynamic timeout according to one embodiment. In this example, a mobile device 300 includes an application (aka, "App") 301. App 301 may be used, for example, to access and display information stored in one or more databases (e.g., DB 303) on one or more backend servers (e.g., server 302). In one embodiment, the data may be displayed to a user using a variety of charts as describe further below. It is to be understood that the techniques of the present disclosure may be implemented on other client system, such as a browser on a local computer device such as a laptop, desktop, tablet, or the like, for example, and may be used to display other user interface elements, for example.

As App 301 performs transactions with backend server 302, data about the transactions may be stored locally in the client (here, the mobile device 300). In this example, each time the client performs a data request with the server, the client stores a resulting load time and other context in table 350. Here, the client may store numeric values for the following parameters as different fields: network type ("Ntwk Type"), a parameter specifying whether or not a particular data request is the first (initial) data request from the client to the server for a session or project ("First X"), a plurality of numeric values for parameters specifying one of a plurality of data request widget types (e.g., different fields for different widget chart types), a parameter specifying a latency, and a resulting load time. In this example, the data request types are for different widget chart types 310-313 such as a bar chart "Bar," a dynamic table control "DTC," a time series chart "TS," a dynamic text chart "Dynamic," a geospatial chart "Geo," and a metric chart "Metric". The latency parameter may be a value corresponding to a difference between a first time when the client system sends a data request to the server system and a second time when the client system receives a response from the server system. Latency values may be assigned by the software determining network, transaction, and other conditions and/or configurations and assigned different values, for example.

Each data request may cause context data (e.g., data values x1-x9) and a load time (e.g., data value o1) to be stored in table 350. For example, the network type parameter (x1) may specify one of a WiFi network or a cellular network, and may have different values for different networks types (e.g., a 1 for WiFi and a 2 for cellular). In one embodiment, the values are assigned such that higher speed networks have lower numbers and lower speed networks have higher numbers. Accordingly, when weights are applied to the different network values, the resulting contributions to load time automatically scale (e.g., a weight of 1.34 times 1 for WiFi is smaller than 1.34 times 2 for a slower cellular network). The initial data request indicator (x2) may be represented by a 0 if the request is an initial (first) request or a 1 if the request is not an initial request. In this example, different widget chart types (x3-x8) for a transaction may be represented in the table by values. For example, if a transaction involves a bar chart, then a value of 1 is stored in the table in the "Bar" field and a value of zero is stored in fields for all the other chart types. Similarly, if a data request is for a time series chart, then a value of 1 is stored in the table in the "TS" field and a value of 0 is stored in fields for all the other chart types. Latency, x9, may be represented similar to network type, where different values correspond to different latencies. Such values may be similarly assigned on the basis on increasing values to automatically scale the load time when weights are applied, for example.

In various embodiments, context and load time data may be stored for numerous data requests. In one embodiment, context and load time data is stored for a maximum number of data requests for each data request type. For example, 75 load times and context parameters may be stored for a bar chart data request type, 75 load times and context parameters may be stored for a DTC data request type, and so on for each of the different chart types, for example. Once the maximum number is reached, new data is stored and old data is deleted. For example, data corresponding to a most recent data request for a bar chart data request type may be stored, and stored data corresponding to an oldest data bar chart data request may be deleted when the maximum number of stored data requests for a bar chart data request type is reached. This technique may be advantageous for real time dynamic updates to capture current impacts of existing context to load times, where increases in speed causing reductions in load times decrease the timeout values slowly (as illustrated below). Conversely, increasing the timeouts may be done quickly as described in more detail below.

Once the data is stored, timeouts for future data requests may be calculated and set dynamically. For example, in one embodiment, the stored data is used to calculate weights and offsets, which may be applied to new data requests to produce timeout values. The dynamically calculated timeout values may then be used to set a timeout for particular data requests. For example, mobile device 300 may receive a new instruction to initiate a data request (e.g., in App 301). Such an instruction may trigger the system to generate a timeout. The timeout may be based on weights derived from the stored data together with context parameters of the current environment. In one embodiment, the system determines predictive weights corresponding to the plurality of stored parameters. In this example, weights w1-w9 are determined for network type (w1), First X (w2), the various different types of charts (w3-w8), and latency (w9), for example, where the weights indicate a contribution of each parameter to the load time. Thus, the predictive weights may form an N×1 vector (here, 9×1). In one embodiment, determining weights for the parameters comprises performing a linear regression on the stored data, such as a lease squares estimator (LSE), for example.

Figure 4:
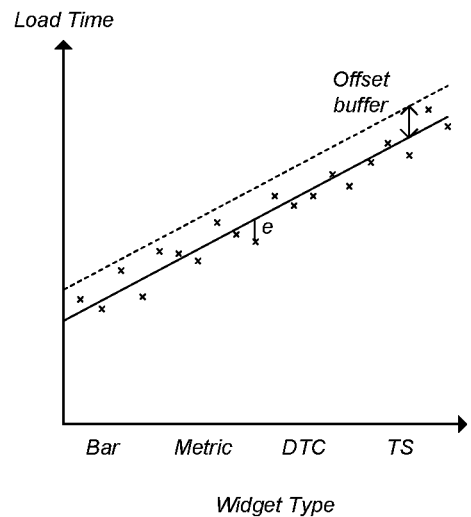
FIG. 4 illustrates an estimated load time and offset buffer according to one embodiment.
Figure 5:
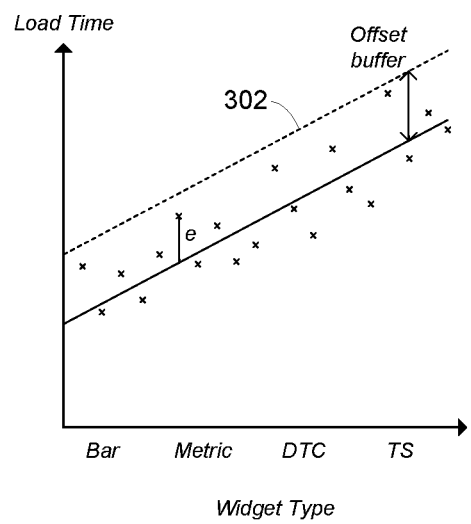
FIG. 5 illustrates an estimated load time and offset buffer according to another embodiment.

Next, a load time offset value is determined based on the stored data. In one embodiment, determining the load time offset value based on the stored data comprises determining a mean squared error of the stored data. FIGS. 4 and 5 illustrate estimated load times and offset buffers according to various embodiments. As illustrated in these figures, least squares regression may be used to map the stored data to weights that may be used to predict load times. Further, the mean squared error may be used to determine variations of the load times. Predicted load times and offsets may be used to establish timeouts dynamically as illustrated below.

The following example illustrates estimating the value of a timeout using Linear Regression. A Linear Regression model shows the relationship between the explanatory variables X, and the dependent variable y (e.g., load time). By applying an estimator $\beta$ to X, we can predict the values of y. Using this method allows us to take numerous factors into account (e.g., network type, connection speed, if the widget uses a remote connection, etc.) when predicting the dependant variable y as follows: $y=X\beta$.

In one embodiment, the Linear Regression model uses a Least Squares Estimator (LSE), $\beta$. The explanatory variable X is multiplied by the LSE to predict a value for y. We can think of the LSE as a set of weight values, one for each explanatory variable in X. For example if our widget uses a remote connection this would cause a large difference in the amount of time it takes to load. This means that when estimating the timeout value for remote widgets, the $\beta$ value corresponding with remote connections would be relatively high, indicating a larger timeout value is needed for remote widgets.

The following illustrates how to obtain the value of the unknown parameter $\beta$. Since we will store information about loading past widgets as a training dataset, including loading time y and the context in which they were loaded (or the explanatory variables) X, we can use them to estimate the value of $\beta$ using the following formula: $\beta=(X^TX)^{-1}X^Ty$.

The follow is an example of predicting y (applying the learned weights to the current setup/context/parameters). Now that we have calculated the LSE $\beta$, we can use it along with the current context X (of a current data requests) to predict the timeout value for a widget by using the formula for Linear Regression: $y=X\beta$.

For this example, the system is to predict the timeout value for a widget using three explanatory variables: [network type, connection speed, remote connection]. Network type will either be WiFi (0) or WAN (1), connection speed will be measured in milliseconds (ms), and remote connection will be 1 if there is a remote connection, otherwise 0. We store these values in matrix X where X=[0, 100, 0], meaning the network type is WiFi, the latency is 100 ms, and the widget does not have a remote datasource. Suppose we have already calculated the values of A$\beta$ and found that $\beta^T$=[3, 0.05, 5]. We can now multiply the 1×3 matrix X by the 3×1 matrix $\beta$ (a dot product) to find the 1×1 matrix (a scalar) y.

$$y=X\beta=0*3+100*0.05+0*5=5$$

In this case, our predicted timeout value for this widget is 5 seconds. As a second example, another widget where X=[0, 150, 1]

$$y=X\beta=0*3+150*0.05+1*5=12.5$$

For this case where the latency is higher, and the widget uses a remote data source, we estimate a higher y value using the same estimator $\beta$. Example code for implementing LSE and MSE is presented in Appendix A.

From the above example it can be seen that once the weights and offset buffer are determined, a load time for the current data request may be estimated based on the weights corresponding to the plurality of parameters and a plurality of parameters describing context for the first data request. For example, the current data request may have a particular network type, it may be the first data request of the session, and it may request data for a particular chart type. These context parameters may be mapped to values in the same way as the context for the stored data was mapped to values, for example. Values for parameters for the current request are then combined with the weights to produce an estimated load time. For example, a dot product may be performed between an N×1 vector of weights (e.g., the 9×1 vector mentioned above) and an N×1 vector of values for parameters describing context for the current data request (e.g., x1-x9 for the current request). The result is an estimated load time. Next, the load time offset value is added to the estimated load time to produce a first timeout value. In one embodiment, a constant less than the load time offset value offset value may be added to the estimated load time to produce the first timeout value. Such a value may be a heuristically determined additional amount of offset to ensure that timeouts are sufficiently high to achieve the desired results. The estimated timeout value may be set as the timeout for the current data request.

In one embodiment, a range check may be performed before setting the timeout to the first timeout value. For example, the first timeout value may be compared to a range, wherein if the first timeout value is above a maximum timeout value, the timeout for the first data request is set to the maximum timeout value rather than the first timeout value, and wherein if the first timeout value is below a minimum timeout value, the timeout for the first data request is set to the minimum timeout value rather than the first timeout value.

In this example, once the range check is completed, the data request is performed using the final timeout value.

In various embodiments, determining weights and an offset value may not be performed on every data request. Rather, the weights and the load time offset value are determined in response to receiving the instruction to open a project, page, story, or the like where the weight context will remain substantially the same over numerous transactions, for example. For example, when a new page is downloaded, or a new story opened to retrieve a plurality of widgets, weights and offsets may be determined and used for subsequent requests, for example.

In one embodiment, a first data request may have a response time exceeding the first timeout value, and the system may produce a timeout. Embodiments of the present disclosure may include an algorithm for increasing the timeout quickly to account for large reductions in network performance across different environments (e.g., when a user moves from a high speed office to a low speed vacation location). In one embodiment, when a response time of the first (or current timed out) data request exceeds the first timeout value, the first timeout value generated for the current data request may be multiplied by a factor greater than one. The resulting multiplied first timeout value and the plurality of parameters describing context for the current data request are then stored with the other context data. Multiplying the first timeout value changes the linear regression and skews the mean square error, thereby changing the weights for the estimated load time and increasing the offset (e.g., significantly) with only one new data point in the context data (increase fast). Then, the step of determining weights is performed again and the step of determining the load time offset value is performed again. Accordingly, on the next data transaction, the estimated load time and offset will be increased. The process may be repeated until the dynamically generated timeout is greater than the actual load time for the data request at the new location, for example.

Figure 6:
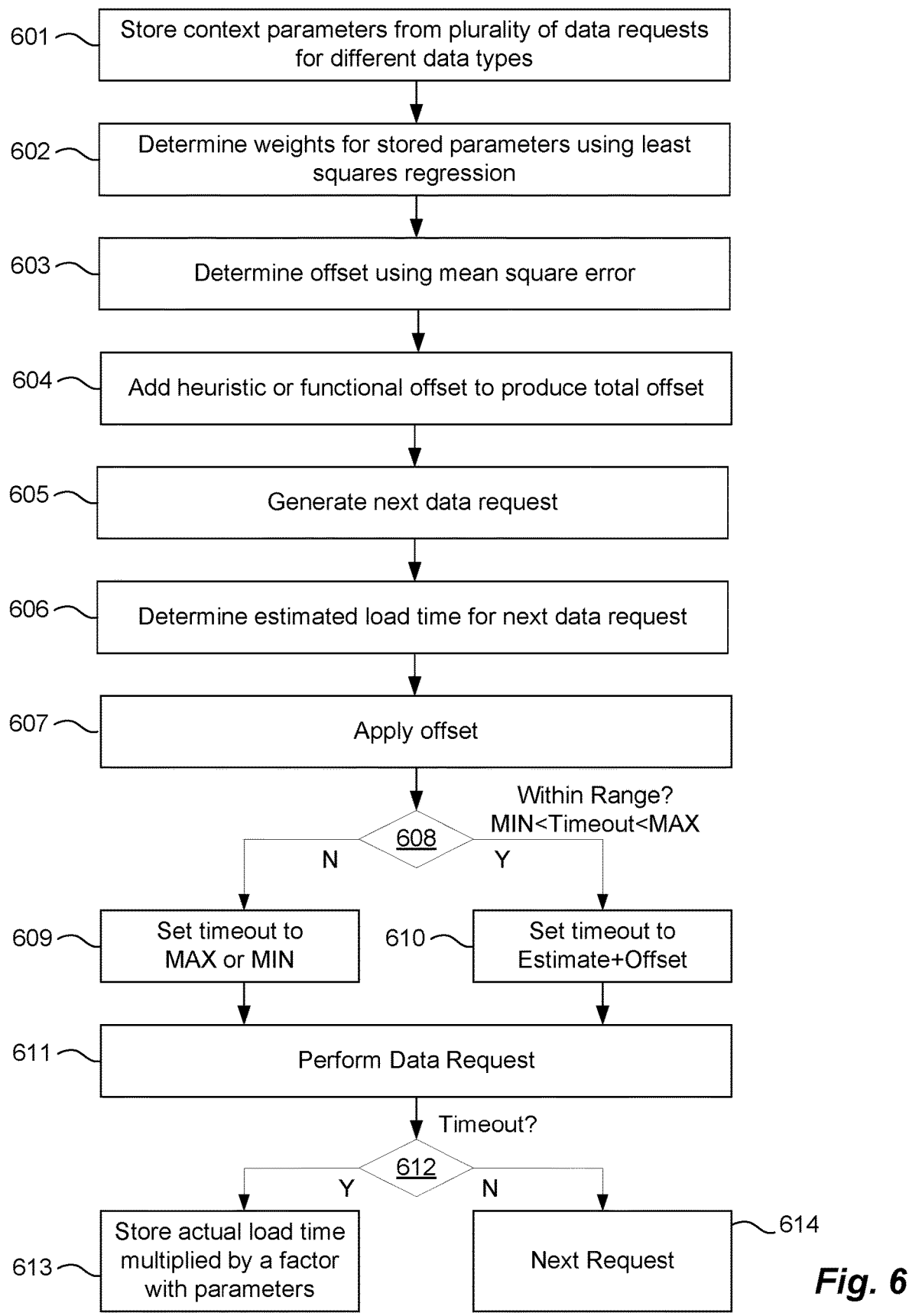
FIG. 6 illustrates an example method of dynamically setting a timeout according to the disclosure.

The process described above is further illustrated as an algorithm in FIG. 6. More specifically, at 601, the process stores context parameters from a plurality of data requests for different data types. At 602, weights for stored parameters are determined using least squares regression, for example. At 603, an offset is determined using a mean square error. At 604, a heuristic or functional offset may be added to produce a total offset. At 605, a next (or current) data request is generated. At 606, an estimated load time is determined for the next data request. At 607, the offset is applied. At 608, a range may be applied. If the estimated load time plus the offset is greater than a minimum value and less than a maximum value, then the process proceeds to 610. At 610, the timeout is set to the estimated load time plus the offset, for example. If the timeout value is outside the range, the process proceeds to 609. At 609 the timeout is set to the minimum value (MIN) of the range if the estimated load time plus offset was below MIN, or the timeout is set to the maximum value (MAX) of the range if the estimated load time plus offset was above MAX.

Example Hardware

Figure 7:
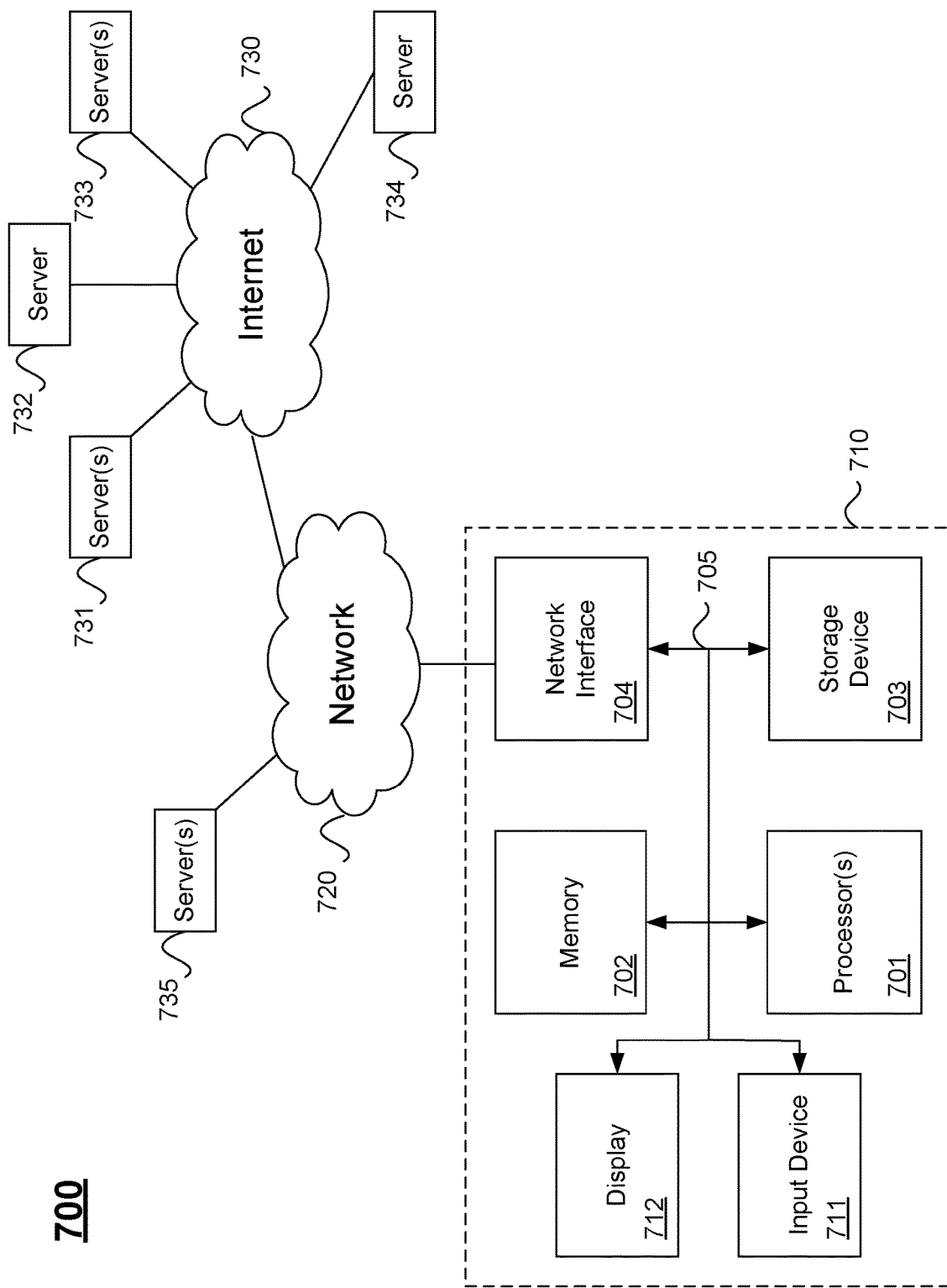
FIG. 7 illustrates computer system hardware configured according to the disclosure.

FIG. 7 illustrates computer system hardware configured according to the above disclosure. The following hardware description is merely one illustrative example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may be coupled via bus 705 to a display 712 for displaying information to a computer user. An input device 711 such as a keyboard, touchscreen, mouse and/or camera is coupled to bus 705 for communicating information and command selections from the user to processor 701. The combination of these components allows the user to communicate information with the system. In some systems, bus 705 represents multiple specialized buses for coupling various components of the computer together, for example.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, a browser or local application, for example, may access data and features on backend software systems that may reside on multiple different hardware servers on-prem 735 or across the Internet 730 on servers 731-734. One or more of servers 731-734 may also reside in a cloud computing environment, for example. Such servers may also comprise hardware such as memory, one or more processors, storage devices, and a network interface similar to computer 710, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

```
-----Description-----
This code snippet shows the high level procedure of how we calculate the least squares
estimator (LSE, the set of learned weights), as well as the mean squared error (MSE)
calculation. The LeastSquares class is the class which runs regression.
-----Code Snippet-----
        /*
            Calculates the LSE coefficients and MSE from the widget load time data stored
in the database.
        */
        @objc
        func calculateLeastSquaresEstimator( ) {
            // Get the past widget load time data
            var loadTimeResultsArray = [Float]( )
            let queryResultsArray = getFormattedResultsFromDB(result:
&loadTimeResultsArray)
            // Only use the regression calculation to predict the timeout if the sample
size is large enough
            if loadTimeResultsArray.count < kMinimumSampleSize {
                return
            }
            // Calculate estimator coefficients and extract results
            let results = LeastSquares.calculateCoefficients(inputMatrix:
queryResultsArray, resultVector: loadTimeResultsArray)
            if results.isEmpty || results.count <
WidgetLoadData.kWidgetLoadDataSize {
                return
            }
            // size - 1 as there is no coefficient for the result stored in
WidgetLoadData
            leastSquaresEstimator =
[Float](results[0..<WidgetLoadData.kWidgetLoadDataSize - 1])
            if WidgetLoadData.kWidgetLoadDataSize - 1 >= results.count {
                resetRegressionVariables( )
                return
            }
            // Calculate the mean squared error
            let residuals = [Float](results[WidgetLoadData.kWidgetLoadDataSize -
1...count])
            let residualSumOfSquares = dotProduct(vector1: residuals, vector2:
residuals)
            let denominator = Float(loadTimeResultsArray.count -
(leastSquaresEstimator.count + 1))
            if denominator == 0 {
                resetRegressionVariables( )
                return
            }
            meanSquaredError = residualSumOfSquares / denominator
        }
-----Code Snippet End-----
-----Description-----
This code snippet shows how we calculate a timeout value before we attempt to load a
widget. The WidgetRenderingContext parameter contains information about the widget
which we extract to the estimateData variable. The returned value is our final timeout
value. Note that the comment block for this function mentions a completion handler
which is no longer implemented (comment is out of date).
-----Code Snippet----
        /*
            Estimates how long a widget will take to load and calculates an appropriate
timeout value for that widget
            - Parameter widgetLoadingContext: WidgetLoadingContext contains
information about loading the widget
            - Parameter completion: Called on completion of the calculation, or early with a
value indicating failure. Accepts a Float argument
        */
        @objc
        func calculateWidgetTimeout(widgetLoadingContext: WidgetLoadingContext) –
```

APPENDIX A-continued

```
> Float {
        if leastSquaresEstimator.isEmpty {
            return kWidgetTimeoutCalculationFailed
        }
        let estimateData = getWidgetVariables(widgetLoadingContext:
WidgetLoadingContext)
        // Estimates how long it will take to load the current widget
        let estimate = dotProduct(vector1: estimateData, vector2:
leastSquaresEstimator)
        // Calculates the timeout value we should use for this widget
        let buffer = calculateBuffer( )
        let timeout = estimate + buffer
        // Constrain the timeout within minimum and maximum values
        return min(max(timeout, kMinimumTimeoutValue),
kMaximumTimeoutValue)
    }
-----Code Snippet End-----
-----Description-----
This code snippet shows how we use the sgelsy_ linear algebra routine to calculate our
LSE.
-----Code Snippet-----
    /*
    Calculates the least squares estimator coefficients
    Columns and rows refer to the dimensions of the data when represented in
matrix form
        X = x00 x01 x02
            x10 x11 x12
            x20 x21 x22
            x30 x31 x32
        Matrix X is 4x3, 4 rows with 3 columns
        LAPACK routine sgelsy requires matrices to be stored columnwise (columns
first), meaning X would be stored as an array:
        X = [x00, x10, x20, x30, x01, x11, x21, x31, x02, x12, x22, x32]
        sgelsy documentation – http://www.netlib.org/lapack/explore-
html/d0/db8/group__real_g_esolve_gaebb028f1d50049bcf4780ffc8cb4f750.html#gaebb
028f1d50049bcf4780ffc8cb4f750
        Note that LAPACK requires the use of unsafe mutable pointers, meaning we
must use certain data types required by LAPACK routines
        - Parameter inputMatrix: The matrix of explanatory variables stored
columnwise (columns first) in an array
        - Parameter resultVector: The vector of resulting values for each set of
explanatory variables in input
        - Returns: Float array, the results of the calculations sgelsy( ) call. The first n
values contain the LSE coefficients,
            and the remaining values (from n to m) hold residuals
        */
    static func calculateCoefficients(inputMatrix: [Float], resultVector: [Float]) ->
[Float] {
        let mInt = resultVector.count
        if mInt == 0 {
            return [ ]
        }
        let nFloat = Float(inputMatrix.count) / Float(mInt)
        let nInt = Int(nFloat)
        if floorf(nFloat) != nFloat || nInt == 0 || nInt >= mInt {
            // Ensure that mInt is larger than nInt, and that nFloat is a whole
number
            return [ ]
        }
        var n = ___CLPK_integer(nInt)
        var m = ___CLPK_integer(mInt)
        // NRHS = 1 as we only suport one column in the resultsVector
parameter
        var nrhs = ___CLPK_integer(1)
        var lda = m
        var a = [___CLPK_real](inputMatrix)
        if a.isEmpty {
            return [ ]
        }
        var ldb = m
        var b = [___CLPK_real](resultVector)
        if b.count < mInt {
            // We need b to be of size mInt in order to store residuals in the
result
            b.append(contentsOf: [___CLPK_real](repeatElement(0, count:
mInt – b.count)))
        }
        var info =___CLPK_integer( )
        var jpvt = [___CLPK_integer](repeatElement(0, count: nInt))
```

APPENDIX A-continued

```
        // RCOND = 0.01, used to determine accuracy of calculation
        var rcond = ___CLPK__real(kRCOND)
        // Rank is used as output from sgelys
        var rank = ___CLPK__integer(0)
        // lwork set to -1 to trigger workspace query, letting sgelsy determine the
amount of memory needed for optimal calculations
        var lwork = ___CLPK__integer(-1)
        var work: [___CLPK__real] = [0]
        // Perform workspace query
        sgelsy_(&m, &n, &nrhs, &a, &lda, &b, &ldb, &jpvt, &rcond, &rank,
&work, &lwork, &info)
        // Extract results from query
        lwork = ___CLPK__integer(work[0])
        work = [___CLPK__real](repeating: 0, count: Int(lwork))
        // Calculate estimator coefficients, results are stored in b
        sgelsy_(&m, &n, &nrhs, &a, &lda, &b, &ldb, &jpvt, &rcond, &rank,
&work, &lwork, &info)
        return b
    }
-----Code Snippet End-----
-----Description-----
This snippet shows the insert SQL used to store the previous load times in the database
Note that """ denotes a multi-line string in Swift.
-----Code Snippet-----
    private let kInsertWidgetLoadTimeSQL = """
        INSERT INTO widgetLoadTimes(result, wifi, remote, firstTimeLoad,
chart, dtc, chartMetric, timeseries, dynamicText)
        VALUES (?, ?, ?, ?, ?, ?, ?, ?, ?)
        """
-----Code Snippet End-----
```

What is claimed is:

1. A computer implemented method comprising:
storing data on a client system, the data corresponding to a plurality of previous data requests from the client system to a server system over a network, the data comprising a load time and a plurality of parameters describing context for each data request;
receiving an instruction to perform a first data request;
determining weights corresponding to the plurality of parameters, the weights indicating a contribution of each parameter to the load time;
determining a load time offset value based on the stored data;
estimating a first load time for the first data request by combining the weights corresponding to the plurality of parameters and a plurality of parameters describing context for the first data request, and in accordance therewith, producing an estimated load time;
adding the load time offset value to the estimated load time to produce a first timeout value; and
performing the first data request, wherein a timeout for the first data request is set to the first timeout value.

2. The method of claim 1 wherein the stored plurality of parameters and the plurality of parameters describing context for the first data request are numeric values.

3. The method of claim 1 wherein said determining weights, said determining the load time offset value, and said estimating the load time are performed in response to receiving the instruction to open a project.

4. The method of claim 1 further comprising, before setting the timeout to the first timeout value, comparing the first timeout value to a range, wherein if the first timeout value is above a maximum timeout value, setting the timeout for the first data request to the maximum timeout value rather than the first timeout value, and wherein if the first timeout value is below a minimum timeout value, setting the timeout for the first data request to the minimum timeout value rather than the first timeout value.

5. The method of claim 1 wherein the stored data forms a matrix having a plurality of rows, each row including a value for load time, a positive value for the specified one of the plurality of data request types and a zero value for each the other data request types, and one of a plurality of values corresponding to the network type.

6. The method of claim 1 wherein determining weights for the parameters comprises performing a linear regression on the stored data.

7. The method of claim 1 wherein determining the load time offset value based on the stored data comprises determining a mean squared error of the stored data.

8. The method of claim 1 further comprising adding a constant offset value less than the load time offset value to the estimated load time to produce the first timeout value.

9. The method of claim 1 wherein the plurality of parameters comprise a plurality of first parameters specifying one of a plurality of data request types and second parameter specifying a network type.

10. The method of claim 9 wherein the plurality of parameters further comprise a third parameter specifying whether or not a particular data request is an initial data request from the client to the server for a session.

11. The method of claim 9 wherein the plurality of parameters further comprise a fourth parameter specifying a latency corresponding to a difference between a first time when the client system sends a data request to the server system and a second time when the client system receives a response from the server system.

12. The method of claim 9 wherein the plurality of first parameters specifying one of the plurality of data request types comprise a plurality of parameters specifying widget types.

13. The method of claim 12 wherein the widgets types correspond to different types of charts to be displayed.

14. The method of claim 1 wherein the client system is one of an application on a mobile device or a browser on a client computer.

15. The method of claim 1 wherein the network type specifies one of a WiFi network or a cellular network.

16. The method of claim 1 wherein estimating a load time based on the weights corresponding to the plurality of parameters and the plurality of parameters describing context for the first data request comprises performing a dot product between an N×1 vector of said weights and an N×1 vector of values for said plurality of parameters describing context for the first data request.

17. The method of claim 1 wherein the data is stored for a maximum number of data requests for each data request type, and wherein data corresponding to a most recent data request is stored, and wherein stored data corresponding to an oldest data request is deleted when the maximum number of stored data requests for a particular data request type is reached.

18. The method of claim 1 wherein, when a response time of the first data request exceeds the first timeout value, the method further comprises:
    storing the first timeout value, multiplied by a factor greater than one, with the plurality of parameters describing context for the first data request with said stored data; and
    repeating said step of determining weights and said step determining the load time offset value.

19. A non-transitory machine-readable medium storing a program executable by at least one processing unit of a computer, the program comprising sets of instructions for:
    storing data on a client system, the data corresponding to a plurality of previous data requests from the client system to a server system over a network, the data comprising a load time and a plurality of parameters describing context for the data request, the parameters comprising a plurality of first parameters specifying one of a plurality of data request types and second parameter specifying a network type;
    receiving an instruction to perform a first data request;
    determining weights corresponding to the plurality of parameters, the weights indicating a contribution of each parameter to transaction time;
    determining a load time offset value based on the stored data;
    estimating a load time by combining the weights corresponding to the plurality of parameters and a plurality of parameters describing context for the first data request to produce an estimated load time;
    adding the load time offset value to the estimated load time to produce a first timeout value; and
    performing the first data request, wherein a timeout for the first data request is set to the first timeout value.

20. A mobile computer system comprising:
    a processor; and
    a non-transitory machine-readable medium storing a program executable by the processor, the program comprising sets of instructions for:
    storing data on the mobile computer system, the data corresponding to a plurality of previous data requests from the mobile computer system to a server system over a network, the data comprising a load time and a plurality of parameters describing context for the data request, the parameters comprising a plurality of first parameters specifying one of a plurality of data request types and second parameter specifying a network type;
    receiving an instruction to perform a first data request;
    determining weights corresponding to the plurality of parameters, the weights indicating a contribution of each parameter to transaction time;
    determining a load time offset value based on the stored data;
    estimating a load time by combining the weights corresponding to the plurality of parameters and a plurality of parameters describing context for the first data request to produce an estimated load time;
    adding the load time offset value to the estimated load time to produce a first timeout value; and
    performing the first data request, wherein a timeout for the first data request is set to the first timeout value.

\* \* \* \* \*